(12) United States Patent
Cody et al.

(10) Patent No.: US 9,857,078 B2
(45) Date of Patent: *Jan. 2, 2018

(54) SIGNAL RESPONSIVE WELL TEST BURNER

(71) Applicant: Halliburton Energy Services, Inc., Houston, TX (US)

(72) Inventors: Trace Wayne Cody, Dallas, TX (US); Timothy Mac Young, Boerne, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/758,325

(22) PCT Filed: Feb. 1, 2013

(86) PCT No.: PCT/US2013/024275
§ 371 (c)(1),
(2) Date: Jun. 29, 2015

(87) PCT Pub. No.: WO2014/120235
PCT Pub. Date: Aug. 7, 2014

(65) Prior Publication Data
US 2015/0354816 A1     Dec. 10, 2015

(51) Int. Cl.
*F23N 3/02* (2006.01)
*F23L 13/00* (2006.01)
(Continued)

(52) U.S. Cl.
CPC .......... *F23L 13/00* (2013.01); *E21B 41/0071* (2013.01); *F23D 11/102* (2013.01);
(Continued)

(58) Field of Classification Search
CPC .... F23N 3/00; F23N 1/02; F23D 3/007; F23L 1/00
(Continued)

(56) References Cited

U.S. PATENT DOCUMENTS 3,185,202 A    5/1965    Mitchell et al.
3,565,562 A    2/1971    Drivet
(Continued)

FOREIGN PATENT DOCUMENTS

EP     0454351       4/1991
JP     04-225705     8/1992
(Continued)

OTHER PUBLICATIONS

PCT International Preliminary Report on Patentability, PCT/US2013/024275, Aug. 13, 2015, 6 pages.
(Continued)

*Primary Examiner* — Gregory Huson
*Assistant Examiner* — Nikhil Mashruwala
(74) *Attorney, Agent, or Firm* — John Wustenberg; Parker Justiss, P.C.

(57) ABSTRACT

A well test burner system includes a plurality of burner nozzles. At least one of the burner nozzles includes a well product inlet, an air inlet, an air/well product mixture outlet, and an automatic valve. The automatic valve is responsive to a remote signal to cease flow of well product to the air/well product outlet.

16 Claims, 3 Drawing Sheets

(51) Int. Cl.
*F23L 1/00* (2006.01)
*F23D 11/46* (2006.01)
*F23D 14/48* (2006.01)
*F23D 11/10* (2006.01)
*F23D 11/38* (2006.01)
*F23G 7/05* (2006.01)
*E21B 41/00* (2006.01)
*F23D 99/00* (2010.01)
*F23N 3/00* (2006.01)
*F23N 1/02* (2006.01)

(52) U.S. Cl.
CPC .............. *F23D 11/38* (2013.01); *F23D 11/46* (2013.01); *F23D 14/48* (2013.01); *F23D 91/02* (2015.07); *F23G 7/05* (2013.01); *F23L 1/00* (2013.01); *F23G 2900/7013* (2013.01); *F23L 2900/07006* (2013.01); *F23N 1/02* (2013.01); *F23N 3/00* (2013.01)

(58) Field of Classification Search
USPC ...................... 431/354, 154, 350, 9; 239/403
See application file for complete search history.

(56) References Cited

U.S. PATENT DOCUMENTS

| | | | |
|---|---|---|---|
| 3,894,831 A | 7/1975 | Glotin et al. | |
| 3,914,094 A * | 10/1975 | Landry | E21B 41/0071 137/510 |
| 3,980,416 A | 9/1976 | Goncalves et al. | |
| 4,011,995 A | 3/1977 | Krause, Jr. | |
| 4,270,561 A | 6/1981 | Bjorklund | |
| 4,348,171 A | 9/1982 | Issenmann | |
| 4,412,811 A | 11/1983 | Pedrosa, Jr. | |
| 4,419,071 A * | 12/1983 | Schwartz | F23D 11/101 239/419.3 |
| 4,452,583 A * | 6/1984 | Brooks | E21B 41/0071 239/399 |
| 4,655,706 A | 4/1987 | Bayh, III | |
| 5,044,558 A | 9/1991 | Young et al. | |
| 5,058,808 A * | 10/1991 | Young | B05B 1/323 239/464 |
| 5,096,124 A | 3/1992 | Young | |
| 5,219,456 A * | 6/1993 | Theriot | E21B 41/0071 239/403 |
| 5,360,334 A | 11/1994 | Kagi, Sr. | |
| 5,464,344 A | 11/1995 | Hufton | |
| 5,636,980 A | 6/1997 | Young | |
| 5,918,670 A | 7/1999 | Coutts et al. | |
| 5,993,196 A | 11/1999 | Young et al. | |
| 6,027,332 A | 2/2000 | Glotin et al. | |
| 6,036,479 A | 3/2000 | Dubach et al. | |
| 7,566,217 B2 | 7/2009 | Morsner | |
| 8,794,588 B1 * | 8/2014 | Jorgensen | F16K 31/1264 251/282 |
| 2006/0127831 A1 | 6/2006 | Kagi, Sr. | |
| 2007/0248920 A1 | 10/2007 | Morsner | |
| 2011/0226218 A1 | 9/2011 | Vongsateanchai | |
| 2015/0204542 A1* | 7/2015 | Tolstoukhov | F23G 7/08 431/5 |
| 2015/0345783 A1* | 12/2015 | Cody | F23D 11/38 431/6 |
| 2015/0354814 A1* | 12/2015 | Cody | F23C 5/06 431/2 |

FOREIGN PATENT DOCUMENTS

| | | |
|---|---|---|
| JP | 11022915 | 1/1999 |
| WO | WO94-08178 | 4/1994 |

OTHER PUBLICATIONS

"The Derwent Environmental Crude Oil Burner," DPIR Ltd., Nicosia, Cyrpus, Jul. 2011, 3 pages.
"Sea Emerald Burner System," EXPRO, Jun. 2011, 2 pages.
"EverGreen Burner Fallout-free and smokeless liquid hydrocarbon combustion," Schlumberger, Apr. 2011, 2 pages.
"Peacock Oil Burner," Flare Industries, Inc., Apr. 2009, 2 pages.
"Flare Systems," John Zink Company LLC, 2001, 3 pages.
PCT International Search Report and Written Opinion of the International Searching Authority, PCT/US2013/024275, Oct. 22, 2013, 9 pages.
Cody, "Aimable Well Test Burner System", PCT/US2013/024281, Feb. 1, 2013, 13 pages.
Cody et al., "Vertically Arranged Well Test Burner System", PCT/US2013/024266, Feb. 1, 2013, 12 pages.
Cody, "Variable Air to Product Ratio Well Burner Nozzle", PCT/US2013/024264, Feb. 1, 2013, 15 pages.

* cited by examiner

SIGNAL RESPONSIVE WELL TEST BURNER

CROSS-REFERENCE TO RELATED APPLICATIONS

This application is a U.S. National Phase Application of and claims the benefit of priority to International Application Serial No. PCT/US2013/024275, filed on Feb. 1, 2013, the entire contents of which are hereby incorporated by reference.

BACKGROUND

Prior to connecting a well to a production pipeline, a well test is performed where the well is produced and the production evaluated. The product collected from the well (e.g., crude oil and gas) must be disposed of. In certain instances, the product is separated and a portion of the product (e.g., substantially crude) is disposed of by burning using a surface well test burner system. For example, on an offshore drilling platform, the well test burner system is often mounted at the end of a boom that extends outward from the side of the platform. As the well is tested, the crude is piped out the boom to the well test burner system and burned. Well test burner systems are also sometimes used on land-based wells.

From an environmental standpoint, it is desirable to have efficient, complete combustion of the product with minimal smoke or oil fallout. The efficiency of the combustion is tied to the air-to-product ratio produced by burner nozzles of the well test burner system. Some well test burner systems have multiple burner nozzles, each sized to produce the proper air-to-product ratio at a specified product flow rate. Therefore, as the volume of product changes, the number of burner nozzles used in burning the product is adjusted by manually opening and closing air and well product supply valves to the burner system to turn burner nozzles or sets of burner nozzles on or off. To operate the system effectively, the production flow rate must be monitored and the number of burner nozzles used adjusted accordingly.

DESCRIPTION OF DRAWINGS

Like reference symbols in the various drawings indicate like elements.

DETAILED DESCRIPTION

Figure 1:
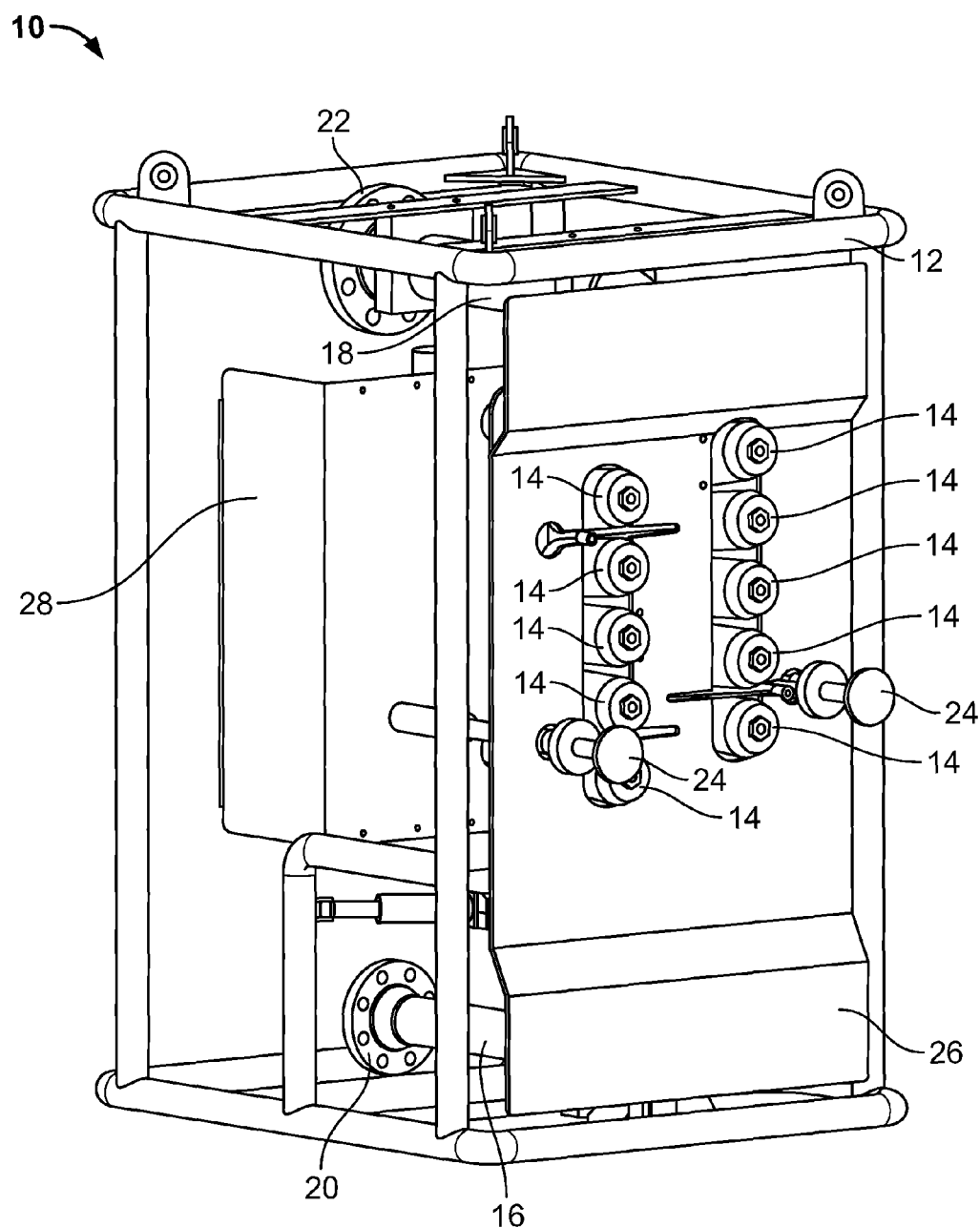
FIG. 1 is a perspective view of an example well test burner system.

FIG. 1 is a perspective view of an example well test burner system 10. The well test burner system 10 is of a type that could be used to burn product produced from a well (e.g., substantially crude oil), for example, during its test phase. In certain instances, the well test burner system 10 is mounted to a boom extending outward from the side of an offshore drilling platform. Alternately, the well test burner system 10 could be mounted to a skid for use with a land-based well.

The well test burner system 10 includes a frame 12 that carries the other components of the well test burner system 10 and is adapted to be mounted to a boom or a skid. The frame 12 is shown as being tubular and defining a substantially cubic rectangular shape, but could be other configurations.

The frame 12 carries one or more burner nozzles 14 adapted to receive air and well product. The burner nozzles 14 combine the air and well product in a specified ratio and expel the air and product mixture for burning. One or more of the burner nozzles 14 can be configured with an automatic valve that can cease or allow flow of the well product and/or air to its outlet, and thus cease expelling the air/well product mixture, in response to a remote signal. In certain instances, the remote signal can originate from a central control room on the platform, another controller on the platform and/or another controller apart from the well test burner system 10. The remote signal can be hydraulic, pneumatic, electric, optical and/or another type of signal.

Ten burner nozzles 14 are shown, but fewer or more could be provided. The burner nozzles 14 are arranged vertically in two parallel columns. In other instances, the burner nozzles 14 can be arranged differently, for example, with fewer or more columns or in a different shape, such as in a circle, offset triplets, or in another different manner.

The burner nozzles 14 are coupled to and receive air via an air inlet pipe 18. They are also coupled to and receive product to be disposed of via a product inlet pipe 16. In certain instances, the air inlet pipe 18 and the product inlet pipe 16 are rigid pipes (as opposed to flexible hose) and can be provided with a swivel joint to allow the burner nozzles 14 to move. They are provided with flanges 22, 20, respectively, to couple to a line from an air compressor and a line providing the well product to be disposed of The frame 12 carries one or more pilot burners 24 that are coupled to and receive a supply of pilot gas. In certain instances, the pilot burners 24 are mounted together with the burner nozzles 14 to move with the burner nozzles 14. Two pilot burners 24 are shown flanking the columns of burner nozzles 14, and each is positioned between the bottom two burner nozzles 14 in each column. The pilot burners 24 burn the pilot gas to maintain a pilot flame that lights the air/product mixture expelled from burner nozzles 14 adjacent to the pilot burners 24. The remaining burner nozzles 14 are arranged so that they expel air/product mixture in an overlapping fashion, so that the burner nozzles 14 lit by the pilot burners 24 light adjacent burner nozzles 14, and those burner nozzles 14, in turn, light adjacent burner nozzles 14, and so on so that the air/product mixture expelled from all burner nozzles 14 is ignited.

In the configuration of FIG. 1, the pilot burners 24 are arranged to produce a pilot flame directed inward across the burner nozzles 14, where the pilot burner 24 on one side produces a flame directed toward the opposite pilot burner 24. This arrangement facilitates lighting the burner nozzles 14 arranged in vertical columns, because no matter which direction the wind blows the flame from the pilot burner 24, the flame always crosses a burner nozzle 14. Therefore, if the burner nozzles 14 are arranged to light one another, as described above, the well test burner system 10 automatically lights and relights while the pilot burners 24 are operating. In other arrangements of burner nozzles 14, the pilot burners 24 can be differently arranged.

The frame 12 carries one or more heat shields to reduce transmission of heat from the burning product to components of the burner system 10, as well as to the boom and other components of the platform. In certain instances, a primary heat shield 26 is mounted together with the burner nozzles 14 and spans substantially the entire front of the frame 12. The heat shield 26, thus, swivels or pivots with the burner nozzles 14. The frame 12 can also include one or more secondary heat shields to further protect other components of the burner system 10. For example, a secondary heat shield 28 is shown surrounding a control box of the burner system 10. Fewer or more heat shields can be provided.

FIG. 2 shows an example burner nozzle 100 that can be used as burner nozzle 14. The burner nozzle 100 is shown in half cross-section to show its features and operation. The burner nozzle 100 has an exterior housing 102 that defines a well product inlet 104 at one end and an air inlet 106 intermediate the ends. The well product inlet 104 is coupled to a supply of the well product to be disposed of (e.g., product inlet pipe 16). The air inlet 106 is coupled to a supply of air (e.g., air inlet pipe 18).

The burner nozzle 100 includes an automatic valve in its interior that is configured to receive the air and well product from the well product inlet 104 and air inlet 106, combine the air and well product, and expel the resulting air and well product mixture from the burner nozzle 100 via an air/well product mixture outlet 108. The air/well product mixture is then ignited by a pilot flame or a flame from an adjacent burner nozzle. The valve is responsive to a remote signal to automatically open or close a well product and/or air path to its outlet 108, and thus cease expelling the air/well product mixture.

To this end, the housing 102 defines an internal cavity that receives a sliding closure sleeve 114. The closure sleeve 114 is carried within the cavity to slide axially on the center longitudinal axis of the housing 102. The outer perimeter of the closure sleeve 114 is sealed to the inner perimeter of the housing 102 at a number of locations by seals 126 (e.g., O-ring seals and/or otherwise). The inner perimeter of the closure sleeve 114 is also sealed to a center member 130 of the housing 102 at a number of locations by seals 126. The seals 126 force all flow from the well product inlet 104 to flow through the interior of the closure sleeve 114 toward the air/well product mixture outlet 108. Similarly, the seals 126 force all flow from the air inlet 106 to flow through the interior of the closure sleeve 114 towards the air/well product mixture outlet 108.

Figure 2A:
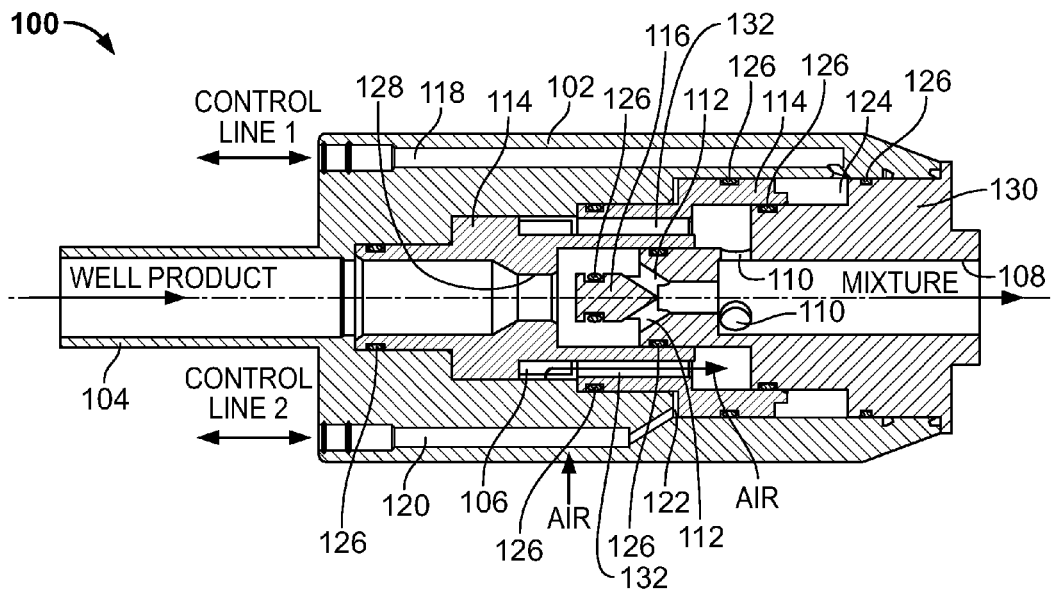
FIG. 2A is a half cross-sectional view of an example burner nozzle that can be used in the well test burner system of FIG. 1. The example burner nozzle is shown in an on position.

A stationary plug 116 is supported by the center member 130 in the housing 102. The plug 116 cooperates with an inwardly facing closure surface 128 of the closure sleeve 114 to seal against (i.e., cease) or allow flow of well product through a well product path from the well product inlet 104 to the air/well product mixture outlet 108. FIG. 2A shows the automatic valve open, positioned to allow flow from the well product inlet 104 to the air/well product mixture outlet 108. With the automatic valve open, the closure sleeve 114 is positioned to the left (toward the well product inlet 104) with the plug 116 spaced apart from the closure surface 128 and other surfaces of the closure sleeve 114. The center member 130, closure sleeve 114 and spaces between the closure sleeve 114 and plug 116 define a well product path from the well product inlet 104 to the air/well product outlet 108.

Figure 2B:
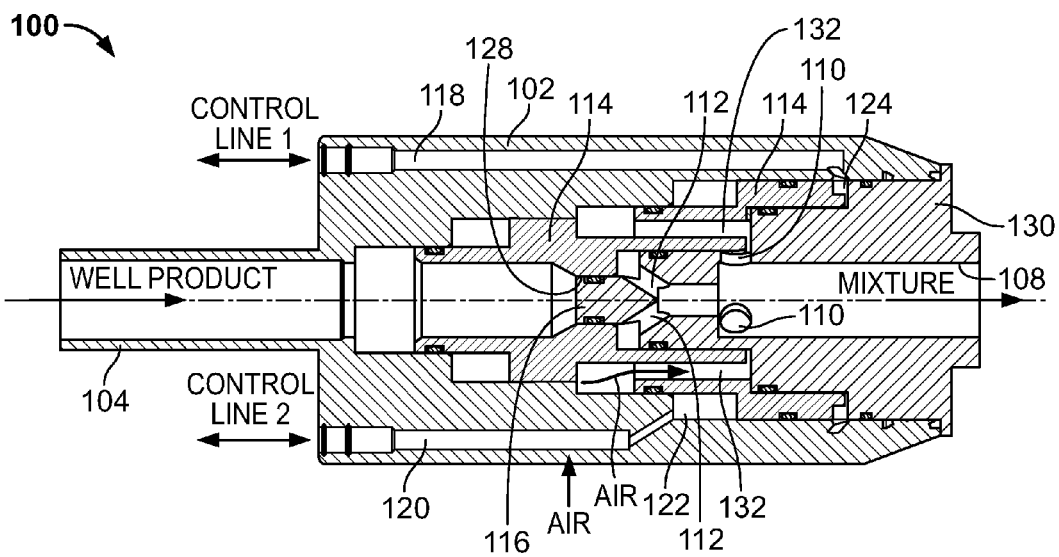
FIG. 2B is a half cross-section view of the example burner nozzle of FIG. 2A, but shown in an off position.

FIG. 2B shows the automatic valve closed, positioned to seal against flow from the well product inlet 104 to the air/well product mixture outlet 108. With the automatic valve closed, the closure sleeve 114 is shifted axially to the right, sealingly receiving the plug 116 in the closure surface 128 to seal against flow from the well product inlet 104 to the air/well product mixture outlet 108. The plug 116 can include seals 126 on its outer periphery that seal with the closure surface or vice versa. The center member 130, downstream of the plug 116, includes converging passage legs 112 that collect well product flowing around the plug 116 and direct the flow in upon itself. The convergent legs 112 promote turbulence in the flow of the well product to the air/well product mixture outlet 108. The turbulence facilitates mixing of the air and well product.

Air flows from the air inlet 106 through a plurality of axial flow ports 132 in the closure sleeve 114 and through a plurality of apertures 110 in the side wall of the center member 130 to reach the air/well product mixture outlet 108. The center member 130 and closure sleeve 114 define an air path from the air inlet 106 to the air/well product mixture outlet 108. The apertures 110 in the center member 130 have a specified flow area selected to meter the air to produce a specified ratio of air and well product supplied to the air/well product mixture outlet 108. In FIG. 2A, with the automatic valve open, the apertures 110 are fully open to allow flow of air to the air/well product mixture outlet 108. In FIG. 2B, with the automatic valve closed, the closure sleeve 114 is positioned over the apertures 110 to reduce the flow area of the air. In certain instances, as shown in FIG. 2B, the closure sleeve 114 can completely close off (e.g., seal against) flow through the apertures 110. The leading edge of the closure sleeve 114 in this region is positioned relative to the stationary plug 116 and the closure surface 128 so that, as the automatic valve transitions from open to closed, the flow area of the air is reduced after the flow area of the well product is reduced and the airflow continues for a short period after the flow area of the well product is sealed. Similarly, as the automatic valve transitions from closed to open, the flow area of the air is opened before the flow area of the well product is unsealed. This relationship ensures that no un-atomized well product is expelled from the air/well product mixture outlet 108. For example, when the flow area of the well product is sealed, some air continues to flow to the outlet 108 to atomize and expel any well product remaining in the well product path. When the flow area of the well product is again unsealed, air has already been introduced to flow to the outlet 108 so that there is enough air to atomize and expel the well product.

The closure sleeve 114 defines two fluid volumes: a volume 122 on an upstream side of the sleeve 114 and a volume 124 on a downstream side of the sleeve 114. The downstream volume 124 is in communication with a first control passage 118 through the housing 102. The upstream side volume 122 is in communication with a second control passage 120 through the housing 102. In use, the first and second control passages 118, 120 are coupled to two separate control lines. The closure sleeve 114 operates as a piston, and the fluid control lines can be alternately pressurized to move the sleeve 114 left and right and operate the automatic valve open or closed. For example, fluid pressure supplied through control passage 118 into the downstream side volume 124 tends to move the closure sleeve 114 axially to the left to open the automatic valve. Fluid pressure supplied through the control passage 120 into the upstream side volume 122 tends to move the closure sleeve 114 axially to the right to close the automatic valve. Although described as a double acting piston (with active fluid volumes on both sides), in other instances, the system could use a single acting piston (with an active fluid volume on only one side) and use a spring to bias the control sleeve 114 toward the open or closed state. Additionally, although described as a pressure/fluid responsive automatic valve, in other instances, the automatic valve could be configured as electrically responsive by substituting an electrical actuator for the piston and control volumes.

Figure 3:
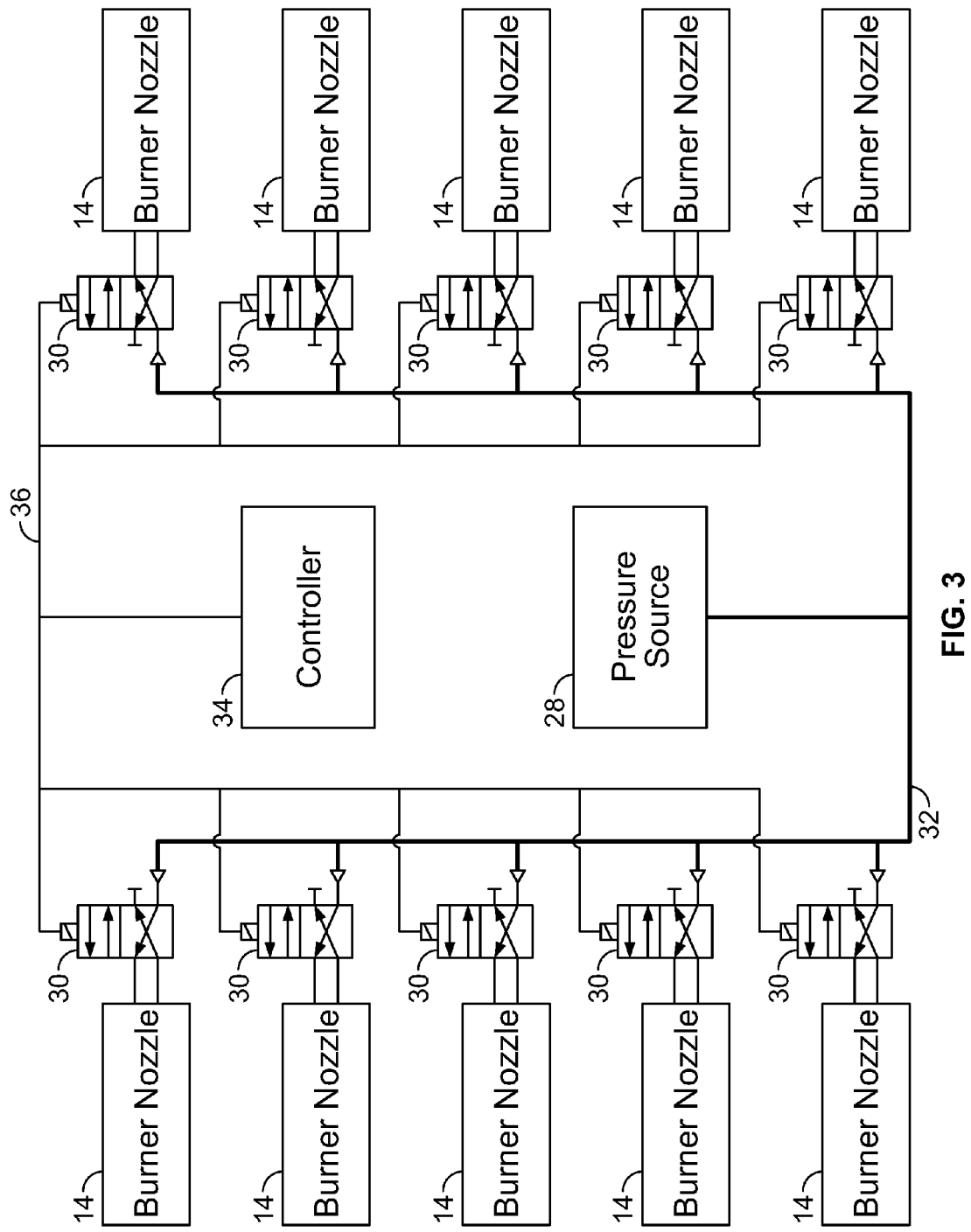
FIG. 3 is an example control schematic an example system for generating fluid signals to actuate burner nozzles.

FIG. 3 is a control schematic of an example system for generating fluid control signals to actuate burner nozzles 14 (including burner nozzles 100, discussed above) of a well test burner. The system includes a pressure source 28 (e.g., hydraulic or pneumatic pressure source) coupled to the burner nozzles 14 with a fluid signal supply line 32. The pressure source 28 supplies fluid pressure to the nozzles via a solenoid control valve 30. One control valve 30 is shown provided at each burner nozzle 14, but in other instances more than one burner nozzle 14 can be grouped onto the same control valve 30. An electronic controller 34 is coupled to the solenoid control valves 30 by an electrical control line 36. The controller 34 generates electric signals to individually address the valves 30 that, in turn, generate fluid signals to open or close the burner nozzles 14. The controller 34 can receive input from an operator and/or another source identifying which of the burner nozzles 14 to actuate open or closed. In certain instances, the controller 34 can include a control loop that automatically operates the burner nozzles 14 based on flow rate of the well product supplied to well test burner system. In certain instances, the pressure source 28 and/or controller 34 are located apart from the well test burner 10, for example, on the platform. In certain instances, the control valves 30 are provided in the control box on the well test burner.

The controller 34 allows fewer than all of the burner nozzles 14 of the well test burner system to be used in destroying well product. Thus, if the flow rate/viscosity through the well test burner system is less than the total capacity of the system (i.e., the total capacity of all the burner nozzles 14), an appropriate number of nozzles 14 can be set actuated closed so that the remaining nozzles 14 are each operating at or near their specified product flow rate. Further, the controller 34 can change the number of burner nozzles 14 while the well test burner is being operated to destroy well product. In other words, the well test burner need not be shut down and restarted to change the number of burner nozzles 14 utilized. The ability to change the number burner nozzles 14 used while continuing to burn the well product saves time in shutdown and restart of the well test burner system when the rate of well product changes.

A number of variations have been described. Nevertheless, it will be understood that additional modifications may be made. Accordingly, other embodiments are within the scope of the following claims.

What is claimed is:

1. A well test burner system, comprising:
a plurality of burner nozzles, at least one of the burner nozzles comprising:
a well product inlet;
an air inlet;
an air/well product mixture outlet; and
an automatic valve actuable to cease or allow flow of well product to the air/well product mixture outlet in response to a remote signal.

2. The well test burner system of claim 1, where the automatic valve is actuable in response to a hydraulic or pneumatic signal.

3. The well test burner system of claim 2, where the valve comprises:
a closure changeable between sealing a well product path to the air/well product outlet and allowing flow through the well product path to the air/well product outlet; and
a piston associated with the closure, the piston in communication with a fluid signal control passage.

4. The well test burner system of claim 3, where the closure is moveable to seal with a stationary plug in the well product path to seal the well product path.

5. The well test burner system of claim 4, where the closure is moveable to reduce a flow area through an air path to the air/well product mixture outlet.

6. The well test burner system of claim 5, where the closure is configured to open the air path to the air/well product outlet prior to opening the well product path in response to the remote signal.

7. The well test burner system of claim 2, where a well product path between the well product inlet and the air/well product outlet comprises convergent legs that promote turbulence in flow of the well product.

8. The well test burner system of claim 1, where the automatic valve is actuable to cease flow of well product to the air/well product outlet in response to a fluid signal to a first control passage and actuable to allow flow to the air/well product outlet in response to a fluid signal to a second control passage.

9. The well test burner system of claim 8, where the valve comprises:
a closure changeable between sealing a well product path to the air/well product outlet and allowing flow through the well product path to the air/well product outlet; and
a piston associated with the closure, the piston having a first side in communication with the first control passage and a second, opposing side in communication with the second control passage.

10. The well test burner system of claim 1, where the valve of at least one of the burner nozzles is responsive to a first remote signal and the valve of at least one other of the burner nozzles is responsive to a second, different remote signal.

11. The well test burner system of claim 1, further comprising a controller configured to individually signal each of a plurality of the burner nozzles.

12. The well test burner system of claim 1, where the valve of at least one of the burner nozzles is actuated to cease flow of well product to its air/well product mixture outlet; and where the valve of at least one other of the burner nozzles is actuated to allow flow of well product to its air/well product mixture outlet.

13. A well burner nozzle for a well test burner system, the burner nozzle comprising:
a valve comprising an air inlet, a well product inlet and an air/well product mixture outlet,
the valve automatically responsive to a remote signal to cease or allow flow of well product to the air/well product outlet.

14. The well burner nozzle of claim 13, comprising:
a valve closure changeable between sealing a well product path to the air/well product outlet and allowing flow through the well product path to the air/well product mixture outlet; and
a piston associated with the valve closure, the piston in communication with a fluid signal control passage.

15. The well burner nozzle of claim 14, where changing the closure to sealing the well product path to the air/well product outlet reduces a flow area through an air path to the air/well product mixture outlet.

16. The well burner nozzle of claim 15, where changing the closure to allow flow through the well product path to the air/well product the closure opens the air path to the air/well product outlet prior to opening the well product path.

* * * * *